US005589636A

United States Patent [19]

Bicz

[11] Patent Number: 5,589,636

[45] Date of Patent: Dec. 31, 1996

[54] METHOD OF AND APPARATUS FOR THE DETECTION OF AN ULTRASONIC FIELD

[75] Inventor: Wieslaw Bicz, Wroclaw, Poland

[73] Assignee: Sonident Anstalt Liechtensteinischen Rechts, Vaduz, Liechtenstein

[21] Appl. No.: 349,880

[22] Filed: Dec. 6, 1994

[30] Foreign Application Priority Data

Apr. 22, 1994 [DE] Germany .......................... 44 14 081.9

[51] Int. Cl.[6] .............................. G01B 17/00; G06K 9/00

[52] U.S. Cl. ................................ 73/617; 73/596; 73/597; 73/620; 128/660.07; 382/121

[58] Field of Search .............................. 73/617, 641, 628, 73/609, 597, 642, 596, 620; 382/121, 125; 333/144, 152; 128/660.07; 348/198

[56] References Cited

U.S. PATENT DOCUMENTS

| | | | |
|---|---|---|---|
| 4,058,003 | 11/1977 | Macovski | 73/609 |
| 4,096,756 | 6/1978 | Alphonse | 73/609 |
| 4,127,034 | 11/1978 | Lederman et al. | 73/626 |
| 4,458,533 | 7/1984 | Borburgh | 73/625 |
| 4,640,132 | 2/1987 | Flora et al. | 73/602 |
| 4,662,223 | 5/1987 | Riley et al. | 73/626 |
| 4,663,746 | 5/1987 | DeMaria et al. | 367/119 |
| 4,663,973 | 5/1987 | Iida | 73/626 |
| 4,706,499 | 11/1987 | Anderson | 73/625 |
| 4,733,562 | 3/1988 | Saugeon | 73/626 |
| 4,974,211 | 11/1990 | Corl | 367/7 |
| 4,976,149 | 12/1990 | Ichikawa et al. | 73/597 |
| 5,235,982 | 8/1993 | O'Donnell | 128/660.07 |
| 5,345,426 | 9/1994 | Lipschutz | 367/103 |
| 5,431,054 | 7/1995 | Reeves et al. | 73/612 |

*Primary Examiner*—Hezron E. Williams
*Assistant Examiner*—Richard A. Moller
*Attorney, Agent, or Firm*—Herbert Dubno

[57] ABSTRACT

The number of transducers in the scanning of an ultrasonic field from an object is reduced by providing ultrasonic collectors at spaced apart locations in the medium and transmitting the ultrasonic waves which are collected to a transducer through waveguides or paths having different transit times. The waveguides can be individually of different lengths or can be of equal length and terminate at different distances along a common collecting waveguide.

11 Claims, 3 Drawing Sheets

METHOD OF AND APPARATUS FOR THE DETECTION OF AN ULTRASONIC FIELD

CROSS REFERENCE TO RELATED APPLICATION

This application is related to the commonly owned application Ser. No. 08/220,712, filed Mar. 30, 1994, now U.S. Pat. No. 5,515,298.

1. Field of the Invention

My present invention relates to a method of and to an apparatus for the detection of an ultrasonic field.

2. Background of the Invention

The detection of ultrasonic fields, whether they are used, for example, to monitor the field distribution or strength in a medium generally or are employed in apparatus for determining surface structures or structures in proximity to a surface of an object from which ultrasonic waves are reflected or scattered (as in the case of the above-described copending application), generally utilizes transducers which convert detected ultrasonic waves transmitted from the object into electrical signals to enable the evaluation of those signals.

The ultrasonic waves which are reflected or backscattered or transmitted, e.g. from an object, have an intensity which is dependent upon the output of the ultrasonic source and the structure of the object which is explored with the ultrasonic field and that intensity must be detected at different locations in the transmitting medium, e.g. a liquid. It has been necessary heretofore to utilize for that purpose a large number of ultrasonic transducers to pick up the waves from all of the directions in which they are transmitted from the object through the medium. It has been found, for example, that a circular array of say 250 transducers are required, each of a diameter of about 1 mm for sufficient measurement and detection of transmitted and received ultrasonic waves in a particular apparatus, e.g. an apparatus for detecting the surface formations of a finger of the user in an ultrasonic fingerprint detecting apparatus for example.

The large number of transducers required in such apparatus necessarily makes the apparatus prohibitively complex and costly and the mass production or serial production of such systems for monitoring ultrasonic fields has therefore not been practical heretofore.

OBJECTS OF THE INVENTION

It is, therefore, the principal object of the present invention to provide a method of determining at a given instant in time an ultrasonic field in a medium by locally determining the ultrasonic waves propagated at each of a multiplicity of locations in that medium, whereby the number of transducers can be greatly reduced.

Another object of the invention is to provide an improved apparatus for ascertaining an ultrasonic field which is of reduced cost and complexity, largely by reason of a significant reduction in the number of transducers which are employed.

Yet another object of the invention is to provide a method of and an apparatus for the determination of surface structures and structures proximal to a surface of an object to be measured, using ultrasound, and whereby drawbacks of earlier devices are eliminated.

SUMMARY OF THE INVENTION

These objects and others which will become apparent hereinafter are attained, in accordance with the invention in a method of detecting ultrasonic waves propagated through a medium and, in particular, locally detecting ultrasonic field intensity in a medium at a given instant in time. The method comprises:

(a) at a given time collecting respective ultrasonic waves at each of a plurality of spaced apart locations in the medium;

(b) passing ultrasonic waves collected at the given time at each location from the respective location to a common detection site along a respective path assigned to the respective collection location having a sound transit time different from sound transit times of others of the paths terminating at the common detection site; and (c) detecting ultrasonic waves received at the common detection site with a single transducer responsive to ultrasonic waves from a plurality of the paths received in a time-spaced relationship determined by the respective sound transit times, and converting the detected ultrasonic waves to electrical signals with the transducer.

As will be apparent hereinafter, the single transducer can be provided at an end of a common waveguide, ultrasonic waves from the plurality of the paths being delivered to the common ultrasonic waveguide at different distances therealong from the transducer. In a particular case, the paths can be formed by reflecting the ultrasonic waves through the medium. More commonly, however, the paths will be individually defined by respective ultrasonic waveguides.

An apparatus for locally detecting an ultrasonic field in a medium at a given time can comprise means for simultaneously collecting at the given time respective ultrasonic waves of the ultrasonic field at each of a plurality of spaced apart locations in the medium; means for passing ultrasonic waves collected at the given time at each location from the respective location to a common detection site along a respective path assigned to the respective collection location having a sound transit time different from sound transit times of others of the paths terminating at the common detection site; and a transducer at the common detection site for detecting ultrasonic waves received at the common detection site and responsive to ultrasonic waves from a plurality of the paths received in a time-spaced relationship determined by the respective sound transit times, and converting the detected ultrasonic waves to electrical signals.

In the case where the paths are a result of reflected sound, the means for simultaneously collecting at the given time respective ultrasonic waves of the ultrasonic field at each of a plurality of spaced apart locations in the medium can be a plurality of ultrasonic reflectors disposed at the location and directing ultrasonic waves reflected by the reflectors along different paths through the medium to the transducer.

The waveguides connected to the various locations can be of the same length and connected to a common waveguide terminating at the transducer, the connections to the common waveguide being spaced therealong to establish to different ultrasonic transit times. Alternatively, the waveguides can individually be of different lengths and can all terminate at the transducer. The waveguides can contain a liquid transmission medium for the ultrasonic waves or can use a solid transmission.

Thus while the system of the invention picks up the ultrasonic waves simultaneously at a multiplicity of locations, the intensities of the waves can be measured sequentially as a function of the respective transit times whether these transit times are a result as a reflection through the medium or as a result of different path lengths through the ultrasonic waveguides. A single transducer or a significantly reduced number of transducers can thus be employed by a multiplicity of pick up locations, the evaluating computer being programmed to treat each signal as derived from the particular location based upon the predetermined known and stored transit times and the given lag of one received signal from the next.

As noted, the path lengthening for the signals arriving from different directions and locations in the medium can be effected in various ways. For example, the collectors may be mirrors reflecting the sound to the transducer through the medium from different locations over paths of different lengths. It is also possible to transmit the sound from the respective collectors through waveguides of different transit times. The waveguides can have different lengths or the same lengths but with different intrinsic transit times by reason of the speed of sound of respective mediums, or by connecting equal length waveguides at spaced locations along the common waveguide terminating in the transducer. The mirror or waveguide can be located in a liquid medium and the waveguides can also be located, if desired, in a solid medium for propagation of the ultrasonic field.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
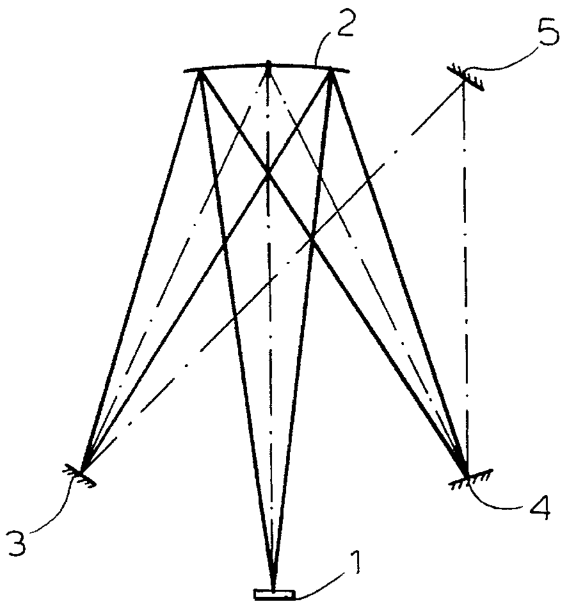
FIG. 1 is a diagram in which the paths with different transit times are formed by a set of mirrors according to one aspect of the invention.

FIG. 1 shows schematically the path lengthening effect of a set of differently oriented mirrors. An ultrasonic transmitter 1, projects its ultrasonic waves toward a plate 2 of glass on which an object can be mounted, through an acoustic transmission medium which can be gas, liquid or solid. The waves reflected or scattered from different points of the object are intercepted at different locations by the mirrors 3 and 4 which form collectors capable of being disposed in an array allowing the reflected and backscattered waves from the object to be picked up at a given point in time by the reflectors 3 and 4 and to be reflected through the medium along paths shown in dot-dash lines of different lengths and hence different sound transit times, to the transducer 5.

The orientations of the mirrors 3 and 4 remain constant relative to the medium and the object and thus the transmit times for the respective waves is known and the output of the transistor will indicate the intensity at each of the pickup locations as a function of the time lag between arrival of successive ultrasonic signals.

Figure 2:
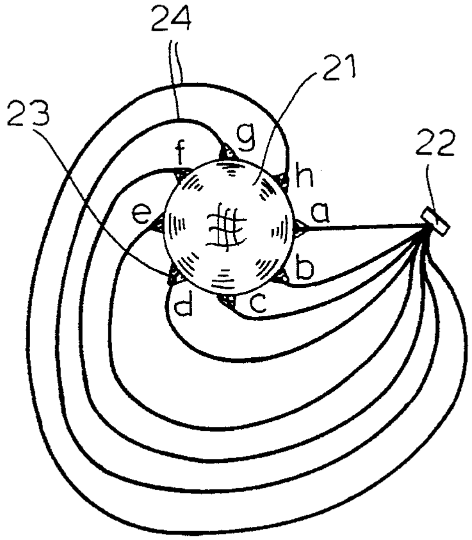
FIG. 2 is an elevational view of a portion of an apparatus using waveguides of different individual lengths terminating in a common transducer.

In FIG. 2, waveguides are used to deliver the ultrasonic waves transmitted by a medium 21 which can be, for example, a plate upon which an object can rest. The ultrasonic waves are transmitted to collectors 23 disposed in an array in the medium at locations a through h, i.e. preferably in a circular array. Via individual waveguides 24 the ultrasonic waves are transmitted to the transducer 22. The waveguides 24 are of different lengths with the waveguide from location a being the shortest and the waveguide from location h being the longest, and thus have different ultrasonic waves transit times. In a fingerprint apparatus in which the object is the ball of a finger, it has been found to be advantageous to step the lengths of the waveguide by one meter from location to location. The waveguide from location b is thus about one meter longer than the waveguide from location a and the waveguide from location c is about one meter longer than the waveguide from location b.

All of the waveguides terminate in the transducer 22. Because of the different lengths of the waveguides the signals arrive in time spaced relationship from the locations a through h and can be evaluated by the computer as deriving from such locations, thereby enabling the object contours to be determined in the manner described in the aforementioned copending application or the earlier work described therein. Instead of utilizing waveguides which individually are of different lengths, the waveguides can have the same length but different transit times resulting from the use of materials having different sound propagation velocities for the waveguides.

The cross sections of the waveguides can also be varied as desired.

Figure 3:
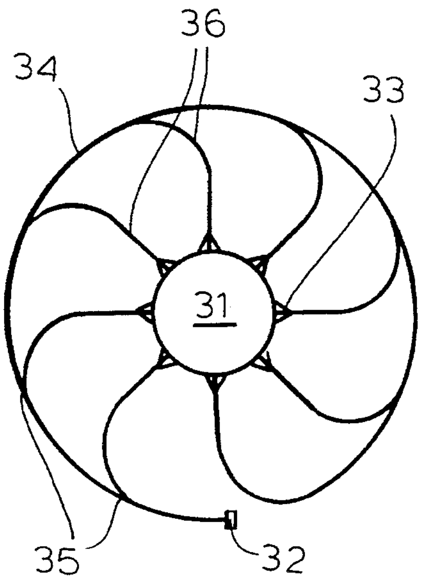
FIG. 3 is a view similar to FIG. 2 of a modification in which individual waveguides connect to a common waveguide at different distances from the transducer.
Figure 4:
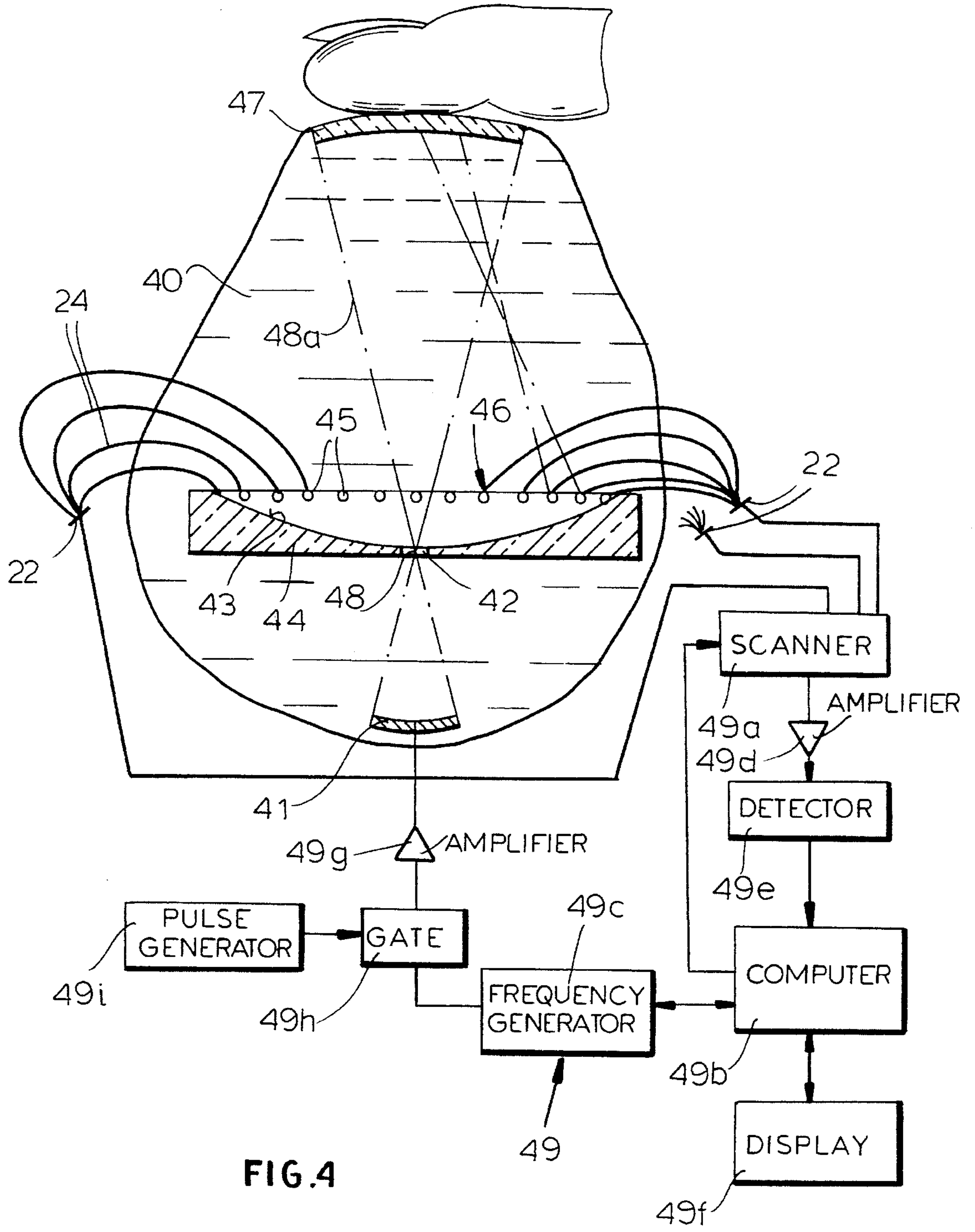
FIG. 4 is a view of an apparatus for determining the contours of a finger as the measured object as one example of an application of the principles of this invention, the apparatus being shown highly diagrammatically and partly in section and partly in block diagram form.

FIG. 3 shows a modification of FIG. 2 wherein the waves transmitted from a medium 31 are collected at spaced apart collectors 33 and supplied to waveguides 36 which are of equal length.

Figure 5:
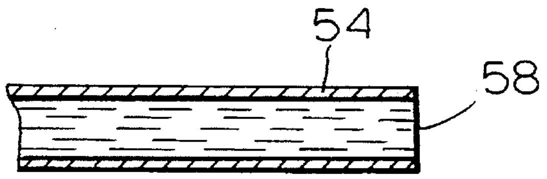
FIG. 5 is a cross section through a portion of a waveguide according to the invention.
Figure 6:
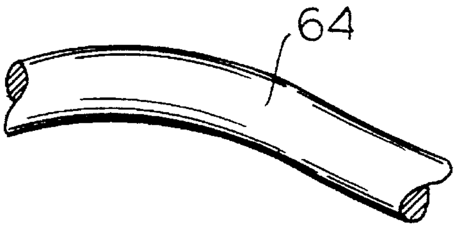
FIG. 6 is an elevational view of a portion of another waveguide.
Figure 7:
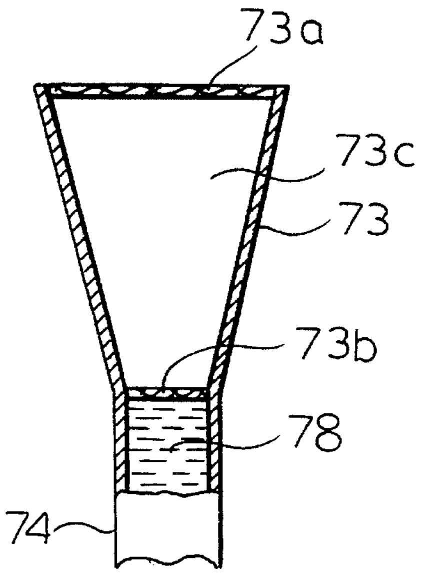
FIG. 7 is a cross sectional view of an ultrasonic pickup which can be used according to the invention.

Waveguides 36 open in spaced relationship into a common waveguide 34 which terminates in the transducer 32. The distances between the locations 35 at which the individual waveguide 36 open into the common waveguide 34 are so selected that the signals from the individual waveguide 36 are separated from one another and arrive at the transducer 32 in the predetermined timed relationship. In the embodiment of FIGS. 1 to 3, the medium is preferably water. As can be seen from FIG. 5, a waveguide 54 can contain a liquid 58 as the filling medium. Alternatively, the waveguide 64 may be composed of a solid material like glass or metal. Where the collectors are not reflectors they may have the configuration shown in FIG. 7 for the collector 73 which has a funnel shape and membranes *73a* and *73b* delimiting a vibration space *73c*, the membrane *73b* confining the liquid 78 of the waveguide 74 to which the collector is affixed.

The apparatus with which the invention is used can correspond to that of application Ser. No. 08/220,712 and can comprise a focusing transducer (electrical-to-acoustic) 41 whose focal point can be located in a hole 42 of a carrier 44. The hole 42 can constitute a point source for ultrasonic waves which are radiated in a cone *48a* toward a support 47, the entire area of which is irradiated by these waves. The point source is represented at 48 and is constituted by the apex of the cone *48a*.

A body of liquid 40, e.g. water, forms the sound transmitting medium between the point carrier 48 and support 47 (see U.S. Pat. No. 5,258,222). The carrier 44 has a spherical surface 43. The support 47, which is transmissive to ultrasonic waves and can be composed of glass, is a convex-concave disk of constant wall thickness, the convex side of which serves as a resting surface for the object, namely, the tip of the finger when the apparatus is used to determine the contours of the finger, i.e. the fingerprint.

On the surface 43 of the carrier 44, instead of the individual transducers of Ser. No. 08/220,712, numerous small receiving collectors 45 are provided, e.g. with the configuration of the collectors of FIG. 7. These collectors 45 are provided closely adjacent one another in a receiving collector ring or annular array 46. The surface 43 is preferably spherical.

The collectors 45 can have waveguides 24 as described in connection with FIG. 2, connected to respective transducers 22 and the transducers 22 may be connected, in turn, to a scanner 49*a* of the circuitry 49.

As will be apparent, therefore, the individual transducers 22, here substantially fewer in number than the collectors 45 can be scanned in succession by the scanner 49*a* under the control of a computer 49*b* which can also receive an input from the frequency generator 49*c* so that with each change in frequency, the receiving transducers can be scanned in sequence.

The scanned output is amplified at 49*d* to feed the detector 49*e* whose DC signal is supplied to the computer 49*b* which provides a display at 49*f* of the pattern of the fingerprint or some property thereof.

The frequency generator 49*c* can supply an amplifier 49*g* feeding the transducer 41 through a gate 49*h* triggered by pulses from a pulse generator or pulse source 49*i*. The apparatus, therefore, thus operates in the manner described in the above-identified copending application to determine the contours of the object placed on the support 47 but utilizes, in accordance with the principles of this invention, a substantially reduced number of transducers.

I claim:

1. A method for detecting ultrasonic waves propagated through a medium, comprising the steps of:

(a) at a given time collecting respective ultrasonic waves at each of a plurality of spaced apart collection locations in said medium;

(b) passing ultrasonic waves collected at said given time at each of said collection locations from the respective collection location to a common detection site along a respective ultrasonic wave path assigned to the respective collection location having a sound transit time different from sound transit times of others of said ultrasonic wave paths terminating at said common detection site; and (c) detecting ultrasonic waves received at said common detection site with a single transducer responsive to ultrasonic waves from a plurality of said paths and received in a time-spaced relationship determined by the respective sound transit times, and converting the detected ultrasonic waves to electrical signals with said transducer.

2. The method defined in claim 1 wherein said single transducer is provided at an end of a common ultrasonic waveguide, ultrasonic waves from said plurality of said paths being delivered to said common ultrasonic waveguide at different distances therealong from said transducer.

3. The method defined in claim 1 wherein said paths are formed by reflecting said ultrasonic waves through said medium.

4. An apparatus for locally detecting an ultrasonic field in a medium at a given time, said apparatus comprising:

means for simultaneously collecting at said given time respective ultrasonic waves of said ultrasonic field at each of a plurality of spaced apart collection locations in said medium;

means for passing ultrasonic waves collected at said given time at each of said collection locations from the respective collection location to a common detection site along a respective ultrasonic wave path assigned to the respective collection location having a sound transit time different from sound transit times of others of said ultrasonic wave paths terminating at said common detection site; and a transducer at said common detection site for detecting ultrasonic waves received at said common detection site and responsive to ultrasonic waves from a plurality of said paths received in a time-spaced relationship determined by the respective sound transit times, and converting the detected ultrasonic waves to electrical signals.

5. The apparatus defined in claim 4 wherein said means for simultaneously collecting at said given time respective ultrasonic waves of said ultrasonic field at each of a plurality of spaced apart locations in said medium is a plurality of ultrasonic reflectors disposed at said location and directing ultrasonic waves reflected by said reflectors along different paths through said medium to said transducer.

6. The apparatus defined in claim 4 wherein said means for passing ultrasonic waves collected at said given time at each location from the respective location to a common detection site along a respective path assigned to the respective collection location comprises respective ultrasonic waveguides defining said transit times.

7. The apparatus defined in claim 6 wherein the waveguides connected to said locations are of the same length but are connected to a common waveguide terminating at said transducer at different locations spaced along said common waveguide to establish different ultrasonic transit times.

8. The apparatus defined in claim 6 wherein said waveguides individually are of different lengths and all terminate at said transducer.

9. The apparatus defined in claim 6 wherein said waveguides contain a liquid ultrasonic transmission medium.

10. The apparatus defined in claim 6 wherein said waveguides are formed with a solid ultrasonic transmission medium.

11. The apparatus defined in claim 6, further comprising at least one other transducer connected by ultrasonic wave paths of different sound transit times to a plurality of further acoustic collectors in said medium.

* * * * *